UNITED STATES PATENT OFFICE.

WILHELM KLAPPROTH, OF OBER-INGELHEIM, GERMANY.

BAKING-POWDER.

1,061,183. Specification of Letters Patent. Patented May 6, 1913.

No Drawing. Application filed May 1, 1912. Serial No. 694,362.

*To all whom it may concern:*

Be it known that I, WILHELM KLAPPROTH, a citizen of the Empire of Germany, and residing at Ober-Ingelheim-on-the-Rhine, Grand Duchy of Hesse, Germany, have invented certain new and useful Improvements in Baking-Powder, of which the following is a specification.

My invention relates to baking-powder which principally consists of an alkali or earth-alkali bicarbonate or carbonate, preferably bicarbonate of soda, and an aluminium salt of lactic acid.

Attempts to employ lactic acid, which is beneficial to the human body, instead of the but little beneficial tartaric acid as the acid constitutent of baking-powder mixtures have heretofore failed owing to the baking-powder mixtures obtained with lactate salts not having the requisite stability. All lactates heretofore investigated for this purpose, particularly the acid lactate of lime, when mixed with bicarbonate of soda, even when the mixture was made very carefully and with perfectly dry materials, very soon caused carbonic acid to be split off even when they were preserved at an ordinary temperature and also had a diminished raising power. After a relatively short time these baking-powder mixtures became unusable. Owing to the ready solubility of the other, better-known lactates the possibility of making a stable "lactic acid baking-powder" seemed hopeless, especially as the soda and potash salt of lactic acid, because liquid, cannot be employed at all as ingredients of baking-powder.

After numerous trials I have succeeded in discovering in aluminium lactate a lactate which, in combination with carbonates and bicarbonates, forms a thoroughly stable baking-powder mixture. During a time of observation extending over several months no diminution of carbonic acid could be observed in a baking-powder mixture made of lactate of aluminium and bicarbonate of soda and kept in an open bowl.

When employed for baking-powder purposes, aluminium lactate has the great advantage, as compared with the lactates employed heretofore for similar purposes, that the relatively costly lactic acid is fully utilized. The conversion takes place, for example, in the case of normal aluminium lactate and bicarbonate of soda according to the following formula:

$$Al(C_3O_3H_5)_3 + 3NaHCO_3 = Al(OH)_3 + 3NaC_3O_3H_5 + 3CO_2.$$

From this it is seen that when employing the aluminium salt, all the acid bound to the aluminium is used for producing carbonic acid.

My new baking-powder can have its properties increased or modified by suitable admixtures and filling agents.

Instead of bicarbonate of soda other bicarbonates and carbonates, such as calcium carbonate for example, may be used. It has also been found that stable baking-powders can be made not only with the normal, but also with the basic, aluminium salt.

I claim:—

1. Baking-powder composed substantially of a lactate of aluminium and a suitable substance which yields carbonic acid when reacting with the lactate.

2. Baking-powder composed substantially of normal lactate of aluminium and a suitable substance which yields carbonic acid when reacting with the lactate.

3. Baking-powder composed substantially of a lactate of aluminium and an alkali carbonate.

4. Baking-powder composed substantially of a lactate of aluminium and an alkali bicarbonate.

5. Baking-powder composed substantially of a lactate of aluminium, a suitable substance which yields carbonic acid when reacting with the lactate, and a filling agent.

In testimony whereof, I affix my signature in the presence of two witnesses.

WILHELM KLAPPROTH.

Witnesses:
 JEAN GRUND,
 CARL GRUND.